US012142297B2

(12) United States Patent
Carrier et al.

(10) Patent No.: US 12,142,297 B2
(45) Date of Patent: Nov. 12, 2024

(54) OOOH PLATFORM: CONTENT MANAGEMENT TOOL FOR CHAINING USER GENERATED VIDEO CONTENT

(71) Applicant: Oooh, Inc., Los Angeles, CA (US)

(72) Inventors: Colin Carrier, Los Angeles, CA (US); Francisco Viciana Ruiz, Kelowna (CA); John Lavender, Kelowna (CA); Christopher Adamson, Kelowna (CA); Derek Hilder, Victoria (CA); Tyler Venables, Kelowna (CA); Allan Bush, Kelowna (CA); Geoffrey Freedman, Kelowna (CA); Simon Roscoe, Kelowna (CA); James Hall, Kelowna (CA); Paulo Rizkalla, Kelowna (CA); Danielle Tilley, Kelowna (CA); Nick Shim, Richmond Hill (CA); Brooke Van Dusen, Oakland, CA (US); Matt Delorme, Kelowna (CA); Roger Braunstein, Victoria (CA); Keely Portsmouth, Kelowna (CA); Mason Macklem, Kelowna (CA); Karina Daniluck, Kelowna (CA); Elsie Ng, Tornoto (CA)

(73) Assignee: OOOH, INC., Los Angeles, CA (US)

( * ) Notice: Subject to any disclaimer, the term of this patent is extended or adjusted under 35 U.S.C. 154(b) by 0 days.

(21) Appl. No.: 17/827,166

(22) Filed: May 27, 2022

(65) Prior Publication Data

US 2022/0383904 A1    Dec. 1, 2022

Related U.S. Application Data

(60) Provisional application No. 63/193,892, filed on May 27, 2021.

(51) Int. Cl.
*G11B 27/031* (2006.01)

(52) U.S. Cl.
CPC .................. *G11B 27/031* (2013.01)

(58) Field of Classification Search
CPC ................................ G11B 27/031
(Continued)

(56) References Cited

U.S. PATENT DOCUMENTS

| | | | | |
|---|---|---|---|---|
| 2013/0212507 | A1* | 8/2013 | Fedoseyeva | G06F 3/04842 715/765 |
| 2013/0232203 | A1* | 9/2013 | Moeinifar | H04L 65/612 709/205 |

(Continued)

FOREIGN PATENT DOCUMENTS

CN           112153394 A   * 12/2020   ............. A63F 13/35

OTHER PUBLICATIONS

English Translation of Chinese Publication CN 112153394A (Year: 2020).*

(Continued)

*Primary Examiner* — Loi H Tran
(74) *Attorney, Agent, or Firm* — Hickman Becker Bingham Ledesma LLP

(57) ABSTRACT

An approach is provided for a content management tool for chaining user generated video content. A method includes providing, for display via a social media application, a first recording of a first user participating in a first session that includes first content. The method includes transmitting, by the social media application, the first recording to a plurality of devices. The method includes receiving, through the social media application, a plurality of submissions, from the plurality of devices, that are based on or responsive to the first recording, each submission of the plurality of submissions comprising a second recording of a user of a device of (Continued)

the plurality of devices. The method includes providing, by a cloud-based software tool, controls for selecting one or more submissions of the plurality of submissions to generate an audiovisual work. The method includes providing the audiovisual work for display via the social media application.

20 Claims, 9 Drawing Sheets

(58) Field of Classification Search
USPC .......................................................... 386/290
See application file for complete search history.

(56) References Cited

U.S. PATENT DOCUMENTS

| | | | | |
|---|---|---|---|---|
| 2016/0253739 | A1* | 9/2016 | Shih | H04N 21/242 705/26.81 |
| 2017/0087460 | A1* | 3/2017 | Perry | A63F 13/497 |
| 2017/0302613 | A1* | 10/2017 | Imbrie | H04L 51/226 |
| 2017/0361234 | A1* | 12/2017 | Lobb | G06Q 50/01 |
| 2019/0108416 | A1* | 4/2019 | Freger | G06V 20/00 |
| 2020/0021894 | A1* | 1/2020 | Sanchez | H04N 21/482 |
| 2020/0139237 | A1* | 5/2020 | Butler | A63F 13/40 |
| 2021/0157946 | A1* | 5/2021 | Learned | G06F 21/6218 |
| 2022/0101451 | A1* | 3/2022 | Mingarelli | G06Q 10/06311 |
| 2022/0210523 | A1* | 6/2022 | Benedetto | G11B 27/19 |

OTHER PUBLICATIONS

Webpurify.com, "UGC Moderation: 22 Tips for Choosing the Best Partner", https://www.webpurify.com/blog/user-generated-content-moderation/, dated Sep. 10, 2019, 9 pages.

Toncheva, Ina, "Content Moderation for UGC Platforms Guide—Solutions, Infographic, Statistics", Imagga Blog, https://imagga.com/blog/content-moderation-for-ugc-platforms-guide-solutions-infographic-statistics/, dated Apr. 9, 2020, 20 pages.

Simpson, Eleanor, "UGC Content Moderation: How to Maintain Quality Standards", Bazaarvoice Blog, https://www.bazaarvoice.com/blog/ugc-content-moderation/, dated Apr. 15, 2022, 22 pages.

HelpLama.com, "User-Generated Content Moderation Guide—Helplama [Infographics]", https://helplama.com/content-moderation-for-ugc-platforms-guide/, retrieved Jun. 1, 2022, 15 pages,.

Edumanias.com, "UGC Moderation—What is it, and Why is it Important", https://edumanias.com/technology/ugc-moderation-what-is-it-and-why-is-it-important/, retrieved Jun. 1, 2022, 10 pages.

* cited by examiner

FIG. 6

602
PROVIDE, FOR DISPLAY VIA A SOCIAL MEDIA APPLICATION, A FIRST RECORDING OF A FIRST USER PARTICIPATING IN A FIRST SESSION; WHEREIN THE FIRST SESSION INCLUDES FIRST CONTENT

604
TRANSMIT, BY THE SOCIAL MEDIA APPLICATION, THE FIRST RECORDING TO A PLURALITY OF DEVICES

606
RECEIVE, THROUGH THE SOCIAL MEDIA APPLICATION, A PLURALITY OF SUBMISSIONS, FROM THE PLURALITY OF DEVICES, THAT ARE BASED ON OR RESPONSIVE TO THE FIRST RECORDING;
EACH SUBMISSION OF THE PLURALITY OF SUBMISSIONS COMPRISING A SECOND RECORDING OF A USER OF A DEVICE OF THE PLURALITY OF DEVICES

608
PROVIDE, BY A CLOUD-BASED SOFTWARE TOOL ASSOCIATED WITH THE SOCIAL MEDIA APPLICATION, CONTROLS FOR SELECTING ONE OR MORE SUBMISSIONS OF THE PLURALITY OF SUBMISSIONS;
THE CLOUD-BASED SOFTWARE TOOL GENERATING AN AUDIOVISUAL WORK BASED, AT LEAST IN PART, ON THE ONE OR MORE SELECTED SUBMISSIONS

610
PROVIDE THE AUDIOVISUAL WORK FOR DISPLAY VIA THE SOCIAL MEDIA APPLICATION

OOOH PLATFORM: CONTENT MANAGEMENT TOOL FOR CHAINING USER GENERATED VIDEO CONTENT

BENEFIT CLAIM

This application claims the benefit of provisional application 63/193,892, filed May 27, 2021, by Colin Carrier et al., the entire contents of which is hereby incorporated by reference as if fully set forth herein, under 35 U.S.C. § 119(e).

FIELD OF THE INVENTION

The techniques described herein relate to software tools for video editing, and more specifically, to systems and methods for chaining user generated video content.

BACKGROUND

To build and maintain subscribers and audiences, content creators seek to continuously explore new and exciting methods of audience engagement. One effective method is to post a video that solicits user generated video content, such as gameplay, responses, reactions, commentary, or other forms of audience interactions. However, managing, organizing, and compiling the user generated video content often requires significant time and resources that may be better allocated to other content production activities. Accordingly, there is a need for content creators to have a more efficient and user-friendly way to manage user generated video content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Implementations are depicted by way of example, and not by way of limitation, in the figures of the accompanying drawings and in which like reference numerals refer to similar elements.

FIG. 6 is a flow diagram that depicts an approach for providing a content management tool for chaining user generated video content.

DETAILED DESCRIPTION

Figure 1:
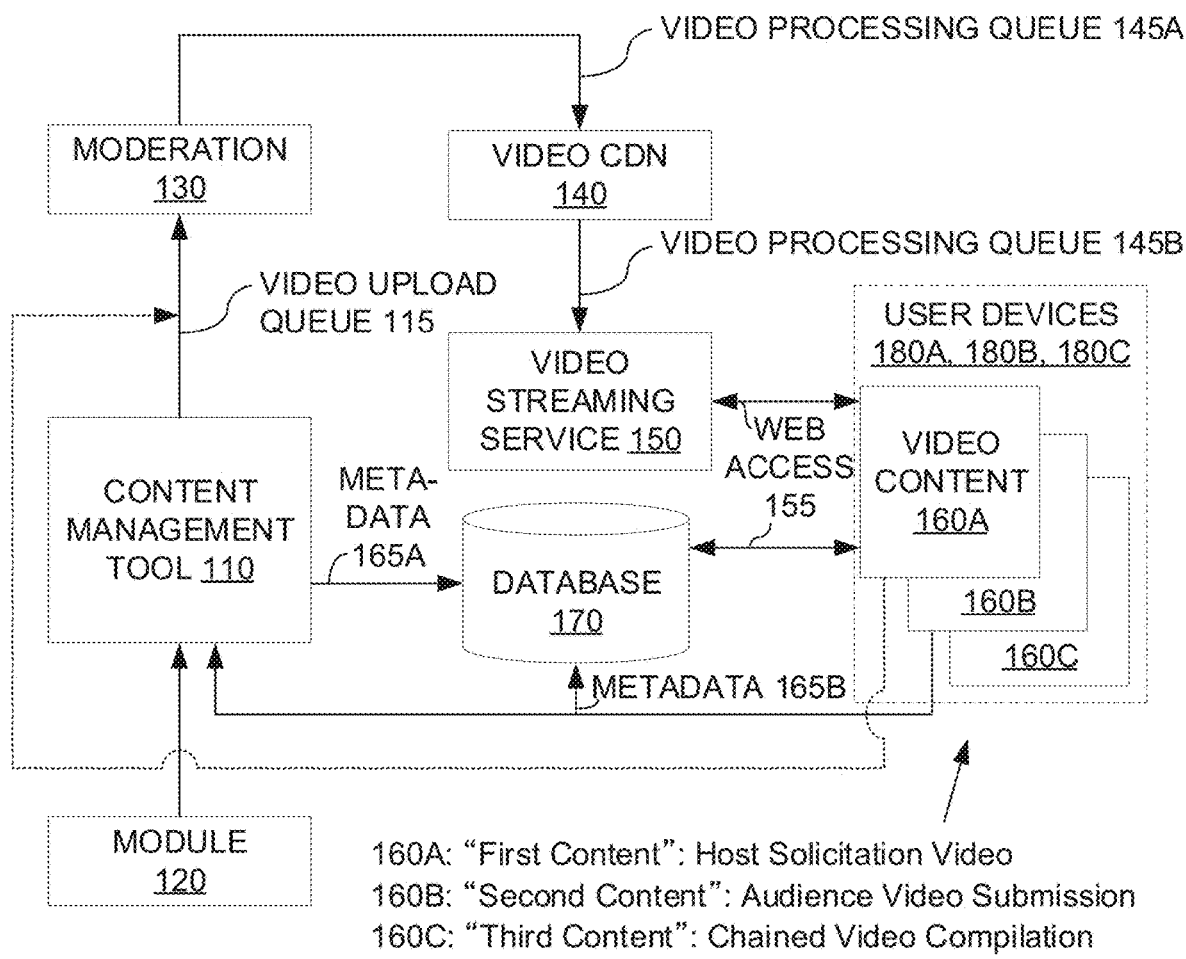
FIG. 1 is a block diagram that depicts a system for providing a content management tool for chaining user generated video content, according to an implementation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Overview
II. Architecture
III. Chaining Together User Generated Video Content
   A. Soliciting User Video Submissions via Asynchronous Interactions
   B. Sorting and Filtering User Video Submissions
   C. Selecting User Video Submissions for a Chain
   D. Publishing the Chain of User Video Submissions
IV. Oooh Platform Module Example: Interactive Game Show
V. Implementation Processes
VI. Hardware Overview I. Overview A cloud-based content management tool is provided to enable content creators or "hosts" to use a module provided by a social media application that supports video streaming services. The module may support a game, activity, or other interactive video experience that allows audience participation in the form of user generated video content. By using the module, a host can generate an initial solicitation video that invites subscribers or audience members to participate in a game, activity, or other video interaction.

After users of the video streaming service view the solicitation video, the users can provide their own user generated video using the same module, which may optionally embed portions of the original solicitation video. The module may also track various metadata concerning a state of the game or activity, such as user scores or other statistics, which can be provided as an informational overlay. The host may use the cloud-based content management tool to sort, filter, and select the most engaging and interesting user submitted content as a compilation of chained videos, which can be further overlaid with additional host commentary, reactions, or other content. The compilation of chained videos can then be published on the video streaming service, where other users can stream, download, and share the compilation content on the social media application or through external platforms, such as third party social networking or video sharing platforms. The compilation video can help content creators to draw in new viewers while retaining engagement and goodwill with existing subscribers.

By providing the content management tool as a cloud-based tool that is part of the social media application, content creators are freed from the burden of learning complex video editing software. Since the tools are cloud-based, content creators do not need to build and maintain high-performance rendering workstations to edit and generate video content. This may be especially advantageous for highly mobile content creators that rely on mobile devices for their daily content creation workflows.

By using sorting and filters to narrow the pool of user generated videos to a manageable number, content creators can easily identify high quality content that is more likely to resonate with their audiences. Higher quality content can also be prioritized in video transmission and process queues for video content distribution networks and backend servers. Content generated by loyal subscribers and contributors can also be surfaced as higher priority content, providing content creators with opportunities to reward their most engaged fans with additional interactions. The sorting and filtering functionality may be especially useful for popular content creators with large and highly engaged subscriber bases that generate significant user submission activity.

II. Architecture

FIG. 1 is a block diagram that depicts a system 100 for providing a content management tool 110 for chaining user generated video content, according to an implementation. System 100 includes content management tool 110, video upload queue 115, module 120, moderation 130, video content delivery network (CDN) 140, video processing queue 145A, video processing queue 145B, video streaming service 150, web access 155, video content 160A, video content 160B, video content 160C, metadata 165A, metadata 165B, database 170, user device 180A, user device 180B, and user device 180C. While not specifically shown in FIG. 1, components of system 100 may communicate via one or more networks. The components of system 100 are only exemplary and other configurations of system 100 may be used.

In one implementation, user devices 180A-180C may correspond to a smartphone, tablet, or other computing device with an imaging device such as a camera. User devices 180A-180C may each execute a social media application to access video content provided by video streaming service 150 and metadata provided by database 170, e.g. via web access 155. Specifically, the video content may be structured according to module 120. A module is a core experience that drives the underlying interactions for Hosts/Content Creators (also referred to herein as "First Users") and Audiences/Participants (also referred to herein as "Second Users" and "Third Users"). Modules are server hosted software applications that run the core activity, game, or interactive video experience and are built by 1st or 3rd party Developers, and may use APIs provided by the social media application to access Sensors, Inputs, Views, Software Libraries, Networks, etc.

Initially, the Host may use module 120 and content management tool 110 to carry out a "First Mechanism" to generate and publish video content 160A, corresponding to a "First Content" or "Host Solicitation Video." Associated metadata 165A may also be generated for storage in database 170. For example, video content 160A may correspond to a video wherein the Host records herself reading out game show questions and inviting audience members to provide their answers in video response format. Metadata 165A may include various parameters of the game show such as questions, accepted answers, and scoring rules.

Before being accessible from video streaming service 150, the video content 160A is first processed through a pipeline as shown in system 100. First, video content 160A is placed in video upload queue 115 before being processed by moderation 130. Queues such as video upload queue 115 may generally operate by default on a first come, first served basis (e.g. FIFO, or First In, First Out).

In some cases, videos having specific associated metadata, which can include metadata retrieved from database 170 and/or other video related metadata such as an indication of being provided from specific users or pertaining to specific subject matter, may be assigned a priority level that allows such videos to be positioned at a higher initial position in one or more queues, such as video upload queue 115 and video processing queues 145A-145B. For example, if a video is associated with a user that has a high reputation score above a predetermined threshold, then the video may be placed at the head or middle of a queue instead of at the tail end of a queue. In another example, a video that exceeds a threshold reaction score due to metadata in database 170 indicating numerous facial expression changes may be prioritized with higher queue positions due to projected higher relevance as an enthusiastic audience response. Other metadata criteria that can be used for queue prioritization, such as module gameplay parameters and device interactions, are also described below in conjunction with metadata 165B. Videos may also be positioned in one or more video transmission or processing queues based on associated sort positions or filter values, as described below in conjunction with FIG. 3.

At moderation 130, computer vision models may be utilized to analyze video content for moderation actions. For example, video content that violates terms of service or is determined to be below a quality threshold may be automatically rejected. In some implementations, moderation 130 may utilize a third-party service provider that is separate from the social media application platform. Valossa is one example vendor that can provide artificial intelligence video recognition and content intelligence services for moderation 130.

At video CDN 140, video content 160A may be stored at multiple geographic locations for quicker distribution to users at various locations. Video content 160A may also be transcoded to various quality and streaming formats to accommodate various user device specifications and network conditions.

At video streaming service 150, video content 160A may be retrieved or cached from video CDN 140 and streamed to any of user devices 180A-180C on demand. For example, assume that user device 180B requests to stream video content 160A, which corresponds to the Host's invitation to participate in the game show. The user of user device 180B may then record himself participating in the game show, which corresponds to video content 160B, or the "Second Content" or Audience Video Submission. This process may correspond to a "Second Mechanism", corresponding to second play experience(s) of module 120 comprising an unlimited number of potential Audience interactions with module 120 and video content 160A. As a result, an asynchronous collaborative or competitive experience is provided between the Host and Audience, encouraging broader audience participation as the audience can join in according to their own schedule and availability. While the example shown in FIG. 1 shows a single audience video submission (video content 160B), multiple user devices can each potentially submit one or more audience video submissions (video content) in response to a single host solicitation video (video content 160A), as illustrated in conjunction with FIG. 2 below.

Video content 160B and other audience video submissions are then provided back to content management tool 110 for potential inclusion in video content 160C, the "Third Content" or the Chained Video Compilation. Optionally, as indicated by the dotted arrow, at least portions of the original host video, or video content 160A, may also be embedded into video content 160B, for example as a picture-in-picture window that is shown during portions or the entire runtime of video content 160B.

When the user devices 180A-180C record video content 160A-160C, additional metadata associated with the video can also be concurrently generated and stored in database 170. For example, when user device 180B records video content 160B, associated metadata 165B may be generated and stored in database 170, which may correspond to the answers that the user provided and any associated scores, points, or other statistics.

Metadata 165B may also include any other gameplay related parameters and interactions associated with module 120. For example, gameplay related parameters may include statistics such as leaderboard positions and high score rankings within friend groups, regional areas, or globally, personal best scores, scores compared to host scores or other participant scores, achievement progress or level completion rate, event participation and ranking within clans, guilds, or other groupings, longest winning streak, best score improvement, and other gaming performance metrics.

Metadata 165B may also include interactions associated with the user's device, such as user device 180B. Device related interactions may include any movement or input data from device sensors and input devices such as motion sensor data, accelerometer data (e.g. device shaking), GPS sensor location data, touchscreen tap and slide frequency, and physical button presses. Device related interactions may also include audio analysis from a microphone or other audio recording device, which may include presence/absence of sounds, background music, and speech. Analysis may be performed directly on the speech waveform (e.g. by measuring tempo, cadence, loudness, etc.) as well as after processing the speech through a speech-to-text engine to detect speaker sentiment and keywords. Device related interactions may also include video and depth analysis from a camera, time of depth camera, or other video recording device, and may include facial recognition, facial sentiment (e.g. moods, emotions), facial modeling, detected objects of interest, and changes in camera perspective and positioning. The above parameters may be combined to determine, for example, an aggregate enthusiasm or emotion score, which can be used to prioritize user submissions into queues, as described above.

Metadata 165B may be determined for time segments of video content 160B substantially in real-time while video content 160B is being generated or recorded, and aggregate scores or parameters may be determined by combining multiple time segments within specific time regions or the entire runtime of video content 160B. Further, the time segments may be weighted depending on their relative position within video content 160B. For example, metadata values for segments near the beginning of video content 160B may be more heavily weighted, since a user may be more likely to view the beginning portion of video content 160B before deciding whether to continue viewing video content 160B.

The Host can utilize content management tool 110, a cloud-based software tool provided by the social media application platform, to select the desired video content to chain together as video content 160C, or the chained video complication. As discussed further below, content management tool 110 can use various sorting and filtering criteria to narrow user submissions to focus on the highest quality submissions, thereby removing much of the burden of managing the user generated video content.

Third Content created and managed by the First User is mutable at First User's discretion and can consist of Second Content (submissions), original video content created by First User, or new rounds of First Content, that Second Users can continue to participate in. Third Content is generated by the First User which includes at least one piece of First Content. Said First Content produced via a Module, is consumed by Second Users, creating Second Content that is passed back to the First User.

III. Chaining Together User Generated Video Content

A. Soliciting User Video Submissions via Asynchronous Interactions

Figure 2:
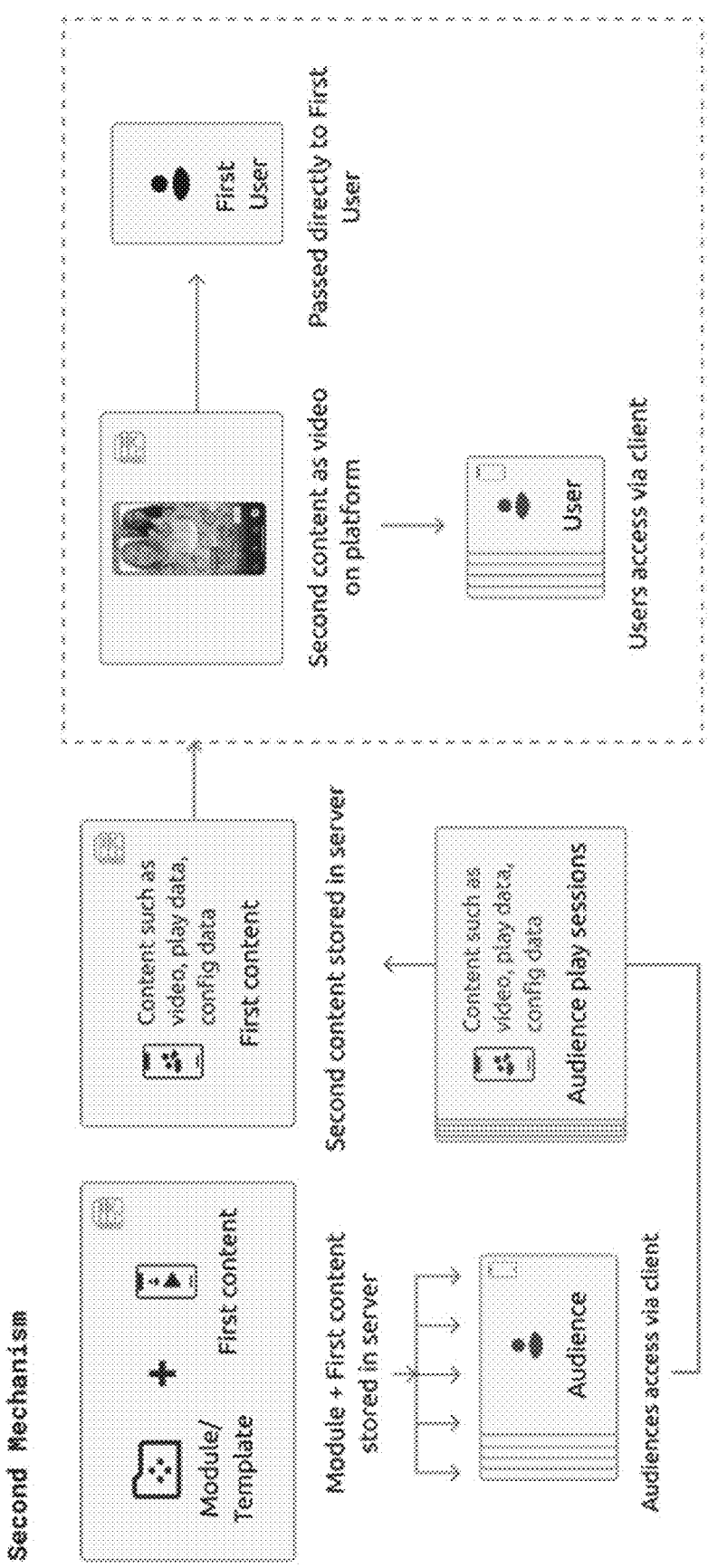
FIG. 2 is a block diagram that depicts a data flow for soliciting user generated video content via asynchronous interactions with host generated content, according to an implementation.

FIG. 2 is a block diagram that depicts a data flow ("Second Mechanism") for soliciting user generated video content via asynchronous interactions with host generated content, according to an implementation. As shown in FIG. 2, the data flow begins with the First user publishing a First content using a module or template, which is then accessible by multiple audience users. Each of the audience users can asynchronously perform a play session using the module to respond to the First content, thereby generating Second content, which can optionally embed the First content. The Second content can be independently accessed and streamed as individual video on the platform, and the Second content is also passed back directly to the First user for potential inclusion as Third content, or a compilation of chained videos.

B. Sorting and Filtering User Video Submissions

Figure 3:
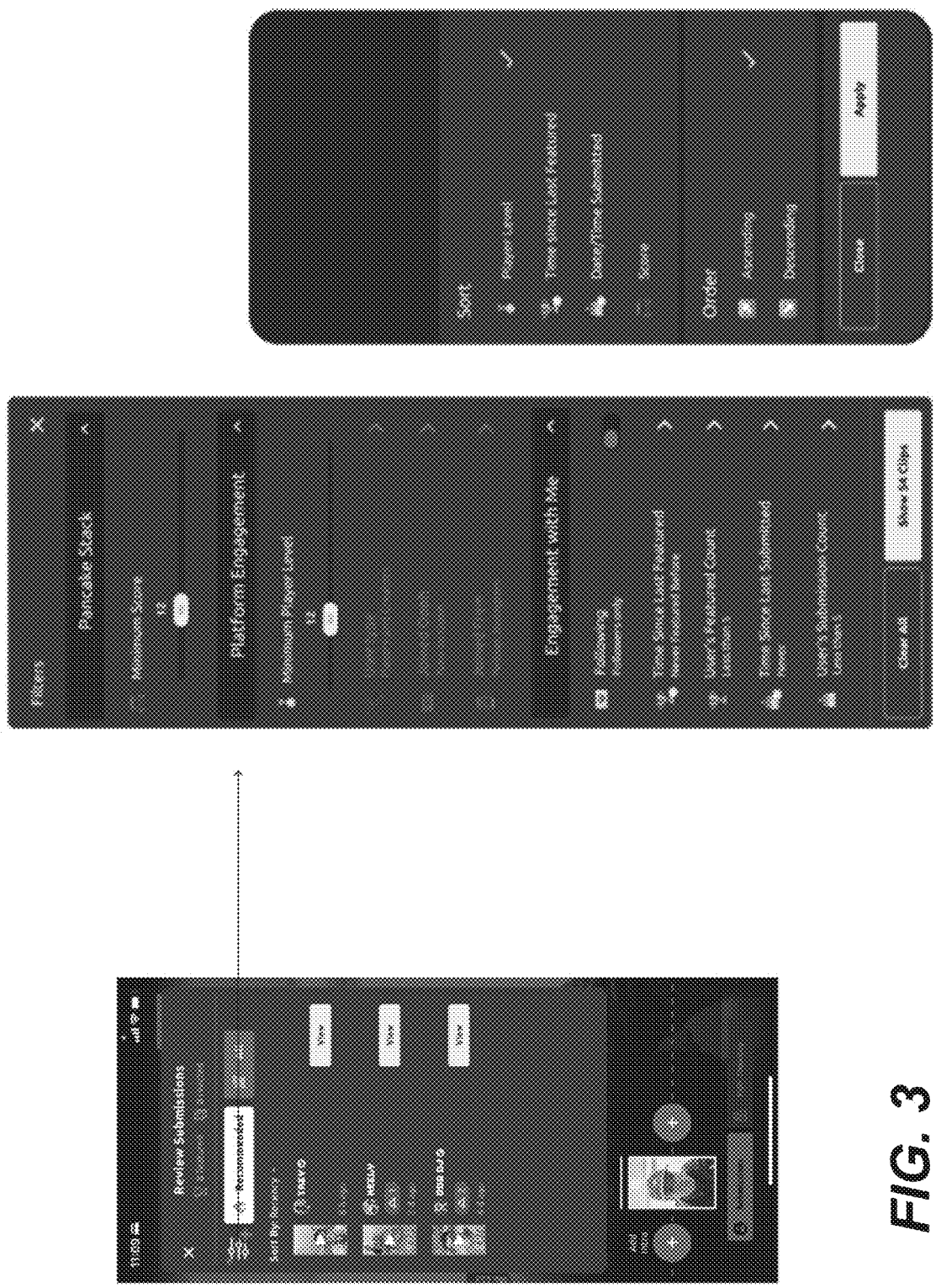
FIG. 3 is a block diagram that depicts example user interfaces of a content management tool for sorting and filtering user generated video content, according to an implementation.

FIG. 3 is a block diagram that depicts example user interfaces of content management tool 110 for sorting and filtering user generated video content, according to an implementation. Due to the plurality of submissions (Second Content), participating in the First Content, the First User has the ability to filter submissions based on a variety of criteria, to better find content and users. Because Second Content is grounded in a Module play experience, metadata from this, is available to the First User. This metadata is dependent on the Module itself, but can be inclusive of score/outcome, settings, options selected, video duration, quality, device information etc. Moreover, meta information about Second User's participation on the platform itself is also shared, providing First User with context about Second User, outside of the Module itself. This meta information may include information such as whether the second user submitted previously to the First User? How long has the second user been on the platform? Has the second user participated in other modules with other First Users? And so forth.

As shown in FIG. 3, the user submissions may be provided in a default "recommended" sort order but may also be configurable according to various sorting criteria and filtering criteria using thresholds and ranges. The sorting and filtering criteria may include, as shown, Module participation, e.g. a score in the game or module according to associated metadata, a level of engagement (Activity level)

to the social media platform, a level of engagement with the Host/First User, a threshold player level, a time since the user was last featured, a date/time submitted, and a score.

The sorting or filtering criteria may also include meeting threshold levels or satisfying acceptable ranges for various parameters and criteria associated with the user submitting the video. These parameters may include a reputation score (which may be tied to the quality and consistency of previous submissions to the social media platform), an influencer score (which may be tied to the quantity and quality of the user's fans and followers), a subscriber loyalty score (which may be tied to the history of interactions between the user and the host), a contributor score (which may be tied to monetary contributions, submissions of fan art, remixes, or other derivative and creative works, comments, collaborations, or other feedback provided by the user to the host), and a linked account score (which may be tied to the quality of other accounts linked to the user, such as associated social networking accounts, or content creator monetization accounts). These various criteria may be adjustably weighted as a compound score and sorted according to the compound score, thereby surfacing user contributions that are meet the criteria that the Host deems most relevant.

C. Selecting User Video Submissions for a Chain

Figure 4A:
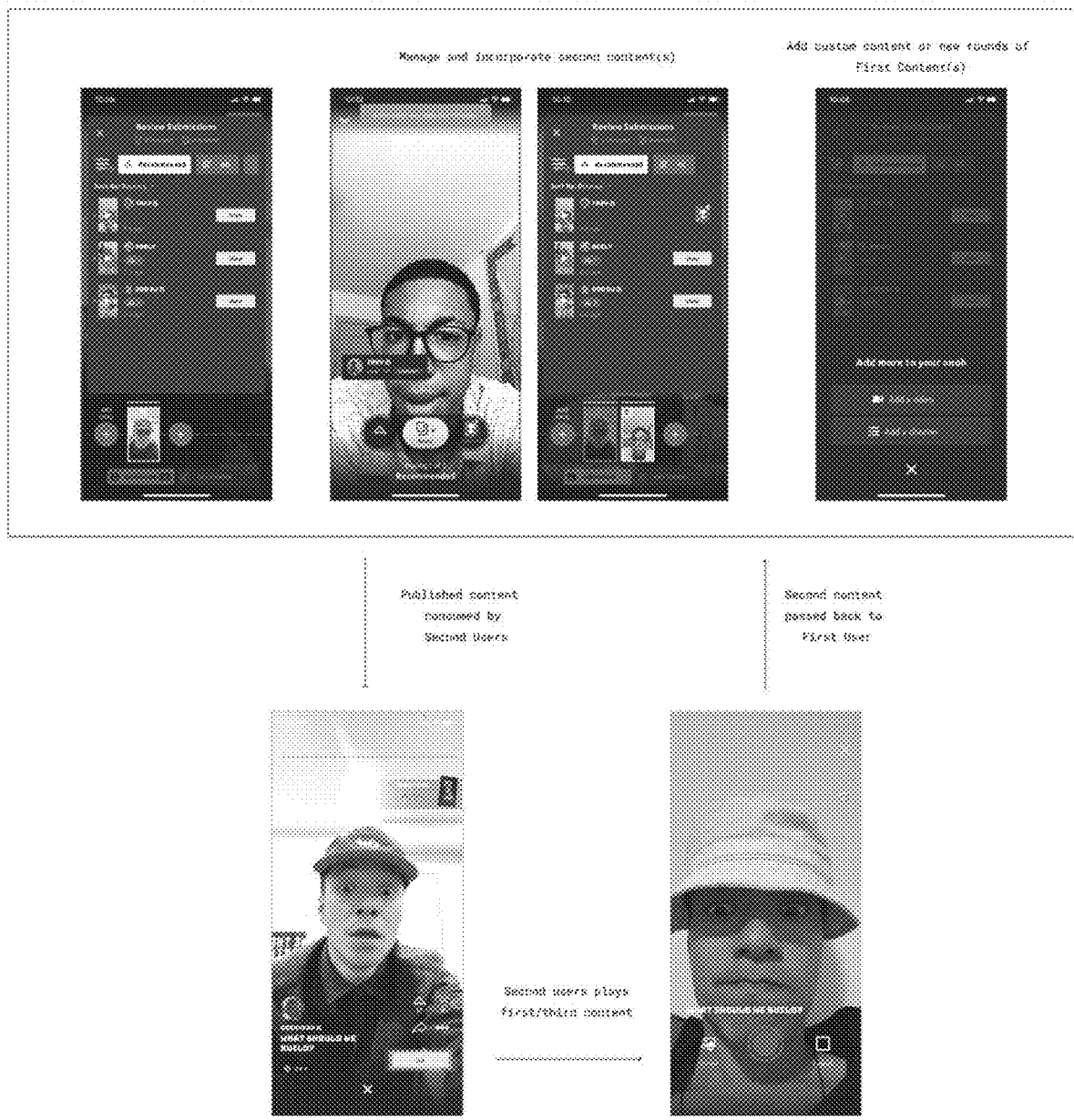
FIG. 4A is a block diagram that depicts example user interfaces of a content management tool for chaining user generated video content, according to an implementation.

FIG. 4A is a block diagram that depicts example user interfaces of a content management tool 110 for chaining user generated video content, according to an implementation. In FIG. 4A, Third Content, created and managed by First User is done through content management tool 110, which may also be referred to herein as "Host Studio", where all Second Content is submitted to. Second Content is a combination of both Video Content and Data; meta information from their participation around First Content and Module. Said content can be viewed, sorted, combined, edited, and responded to by First User.

Below is a table of exemplary operations supported by content management tool 110.

| Operation | Description |
| --- | --- |
| View | Video portion of Second Content can be seen by First User with the option to make this content more publicly visible. |
| Sort | Data portion of Second Content includes metadata from the module play experience and platform information about Second User. This data can be filtered and sorted, allowing First User to better find content and Users of interest. See Filtering Submissions below. |
| Combine | Third Content can be a collection of Second User video assets that are stitched together, by First User, for continuous consumption by Users. |
| Edit | First User has the ability to add text, stickers, or trim Second User video content. |
| Respond | First User can add a video response to a piece of Second Content. This response video can be public or privately viewable and is shown in tandem with this content, overlaid on top as a PIP, or as a trailing video segment. |

Second Content consists of a moderated video stored in a CDN and data representing its experience and gameplay stored in a database. This content is accessed via web services as Second Content is ingested by Host Studio. While in Host Studio, the First User is able to view Second Content(s) and edit and/or combine it with original videos created by First User. This new content can then be published out, again passing modified or added videos through a moderation system, storing safe videos on a CDN, while saving related meta information to a database, thus generating Third Content. This content can again be viewed, and interacted with by Second User(s), who's output can again feed back into Host Studio.

Figure 4B:
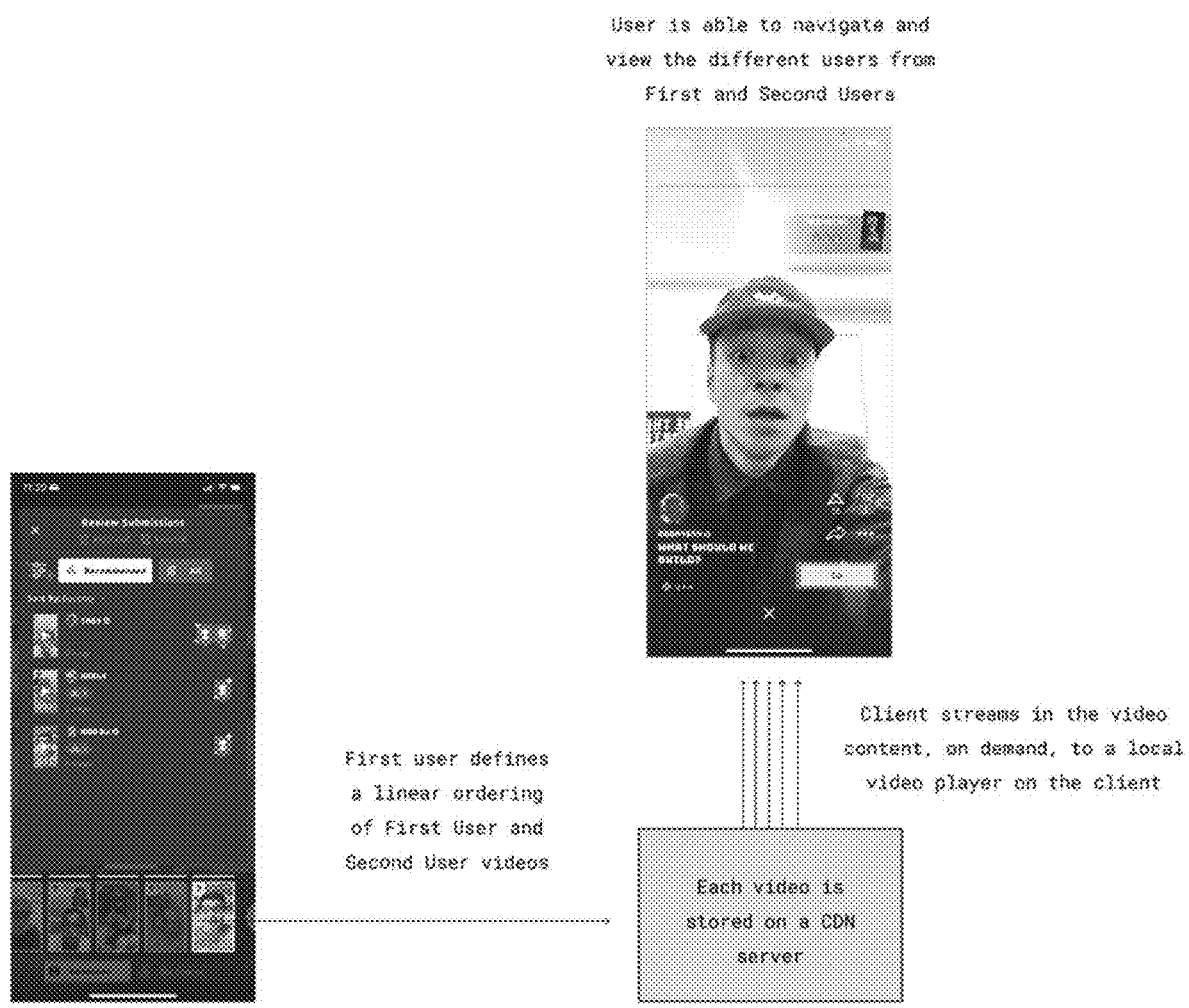
FIG. 4B is a block diagram that depicts example user interfaces of the content management tool for selecting user generated video content to be chained and published together, according to an implementation.

For example, FIG. 4B is a block diagram that depicts example user interfaces of the content management tool 110 for selecting user generated video content to be chained and published together, according to an implementation. Given Second Contents (submissions), the First User is able to create new content (Third Content) using a subset of the submissions along with original content created by First User. This output can manifest itself in a number of ways.

In one embodiment, Third Content can be compiled together as a linear compilation. The First User is able to organize Second User videos, along with his/her own original videos, or First Contents that are interactable, along a linear timeline; ordered in the way the output is to be consumed by users, as illustrated in FIG. 4B. Each video can be manipulated by First User, giving them the ability to add text, stickers, or trim.

D. Publishing the Chain of User Video Submissions

Upon publishing Third Content, each video, though grouped together, is stored individually on a content delivery network (CDN) and pulled down on demand from the client as they navigate through. For example, referring to FIG. 1, the individual videos are stored in video CDN 140 but streamed on demand by video streaming service 150 when a client, such as user devices 180A-180C, requests the Third Content.

IV. Oooh Platform Module Example: Interactive Game Show

In another embodiment, Second Content(s) can be used as inputs into new Module experience, that are played by First User, outputting original Third Content to be consumed on the platform. As Second Content(s) are created, said content is outputted to both the client for consumption and directly to the First User, who was the originator of this content (Second Content is the output of Second Mechanism, which was created through the play of First Content and Module). Where applicable, this content can be passed into a second Module as input parameters. These modules require both a minimum and maximum number of submissions to run, and work in concert with First Content. First Content can be seen as the call to action that drives a particular output (Second Content), that serves as inputs into these second Modules to run.

Figure 5A:
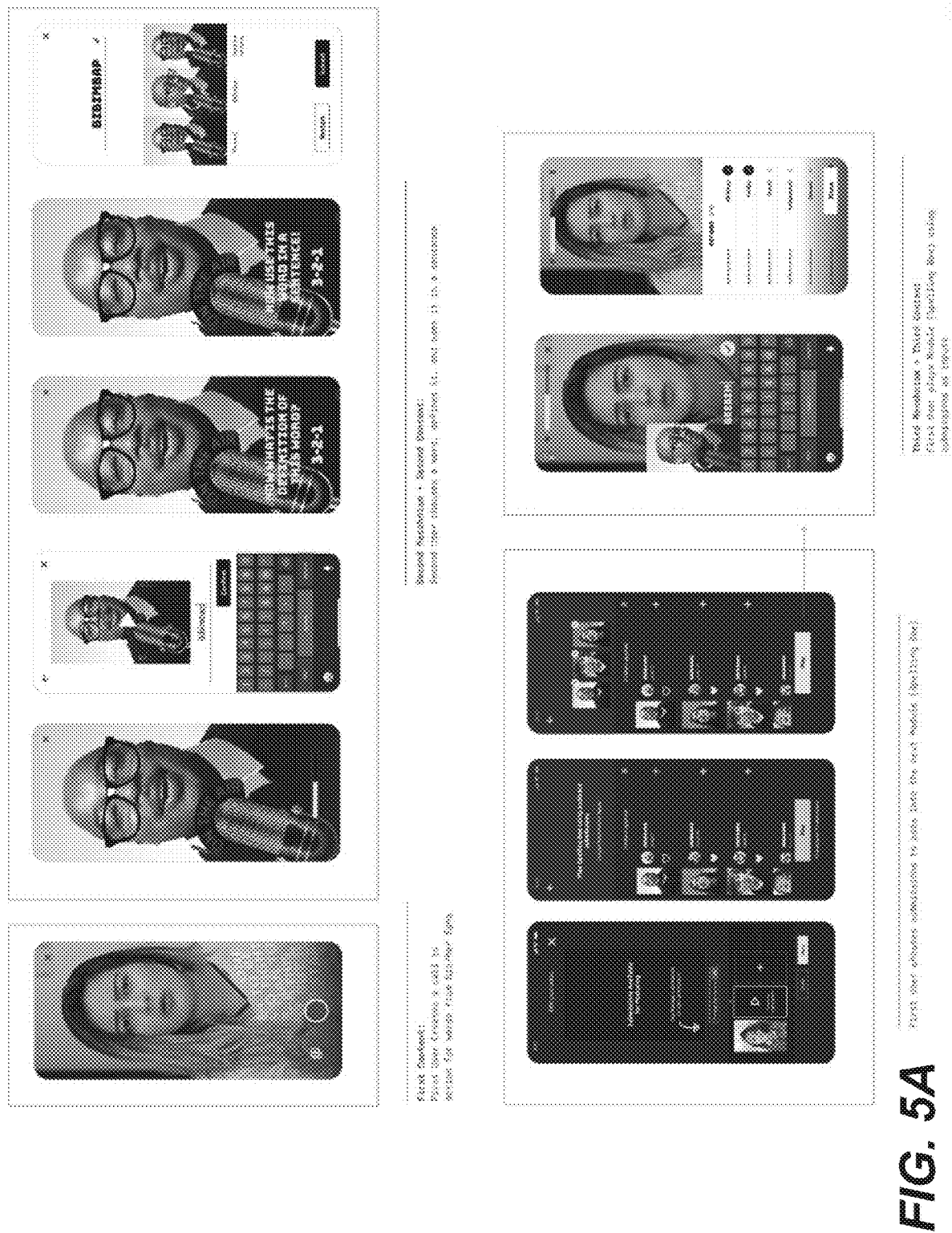
FIG. 5A is a block diagram that depicts example user interfaces for chaining user generated video content in the context of an interactive game show module, according to an implementation.

For example, FIG. 5A is a block diagram that depicts example user interfaces for chaining user generated video content in the context of an interactive game show module, according to an implementation. A Third Content experience, Spelling Bee, is created using Second Content (Second Users choosing words) as input. While a Spelling Bee is provided as one illustrative example, modules can support various experiences such as a video-based game show, a video-based game application, an augmented reality experience, a video commentary, or a video reaction.

For example, one module may be focused on providing a video compilation of favorite items or items sorted into tier lists. The First Content may correspond to the Host providing a callout for audiences to submit their favorite item, or to place announced items into a tier list. The Second Content may then correspond to the audience members speaking about their favorite item or how they slotted the announced items into various tiers, such as S tier, A tier, B tier, etc. The Third Content may then discuss the favorite items from the Second Content, or the various tier lists provided by the Second Content.

In some implementations, portions of the Second Content videos may be overlaid concurrently, rather than linearly or sequentially. For example, one example module may correspond to a combination dance video, wherein the First Content corresponds to the Host dancing alone, the Second Content corresponds to each audience member/participant dancing alone, and the Third Content corresponds to the Host and the audience dancing together. The host might generate several different Third Contents based on groupings of users, or different dance styles, or other matching criteria. The Third Content might be continually updated to reflect new user submissions over time, gradually expanding from a small group to a large fully populated dance floor. In this manner, fresh updates and reinterpretations of the Third Content can be provided to continuously engage audiences.

Figure 5B:
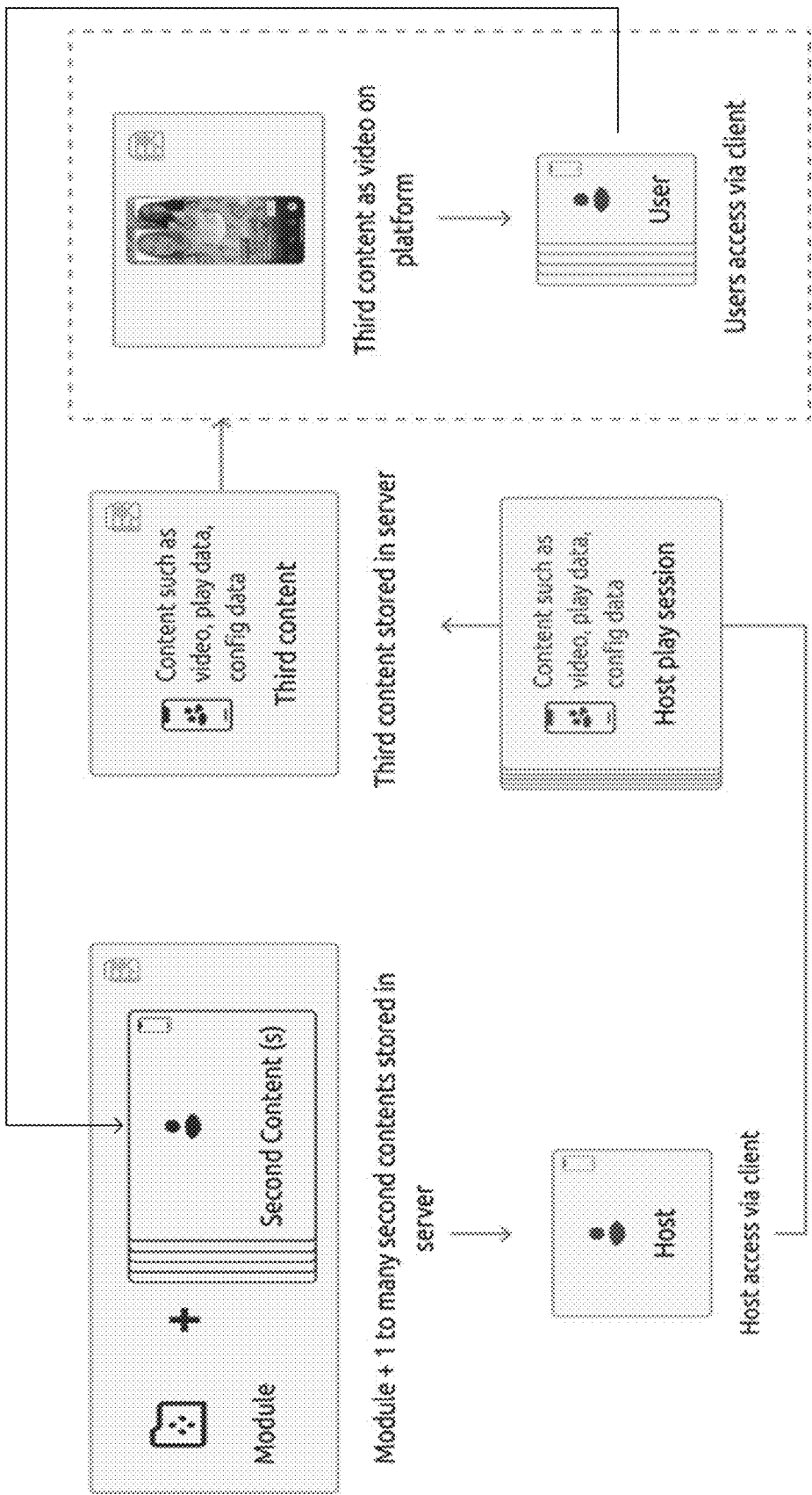
FIG. 5B is a block diagram that depicts a data flow for user generated video content to be chained together by a host in the context of an interactive game show module, according to an implementation.

FIG. 5B is a block diagram that depicts a data flow for user generated video content to be chained together by a host in the context of an interactive game show module, according to an implementation. Second Contents are received by First User in Host Studio. This content is then passed into a second Module as input, creating a dynamic play experience built around audience submissions. This play experience is recorded and outputted back to the client for consumption. User accesses via the client to this play experience (third content) may also lead to the creation of further second contents, which are provided back for storage into the server. This additional second content can be repeatedly used in the Host Studio to further augment the third content, thereby providing continuous new experiences for audiences.

V. Implementation Processes

FIG. 6 is a flow diagram 600 that depicts an approach for providing a content management tool 110 for chaining user generated video content.

In block 602, system 100 provides, for display via a social media application, video content 160A of a first user participating in a first session of module 120, wherein the first session includes first content. For example, a processor of user device 180A may execute the social media application and record video content 160A, e.g. by using a video camera on user device 180A and video editing functionality provided by content management tool 110. The video content 160A may be provided to video streaming service 150 via the pipeline previously described in conjunction with FIG. 1. The video content 160A includes a first user, or the Host, participating in a first session of module 120, e.g. a game show, wherein the first session includes first content, e.g. a game question issued by the Host.

In block 604, system 100 transmits, by the social media application, video content 160A to a plurality of devices. For example, the video content 160A may be published on video streaming service 150, allowing user devices 180A, 180B, 180C, and other user devices to request video content 160A for streaming, downloading, or sharing on demand via the social media application.

In block 606, system 100 receives, through the social media application, a plurality of submissions, from the plurality of devices, that are responsive to video content 160A, each submission comprising a second recording of a user of a device of the plurality of devices. For example, referring to FIG. 2, the plurality of "Audience play sessions" may be recorded as the second recording, corresponding to multiple instances of video content 160B in FIG. 1. Thus, a processor of user devices 180B and 180C may use a respective integrated video camera to record multiple instances of video content 160B from respective participants #1 and #2, wherein the video content 160B (audience participation) is responsive to video content 160A (the host invitation or solicitation video). The plurality of submissions, or video content 160B, may be received by user device 180A via an interface provided by content management tool 110.

In block 608, system 100 provides, by content management tool 110 associated with the social media application, controls for selecting one or more submissions of the plurality of submissions, content management tool 100 generating video content 160C based, at least in part, on one or more selected submissions from video content 160B. For example, as described in conjunction with FIGS. 3, 4A, and 4B, the Host can apply various filtering and sorting criteria to narrow the available user submissions, and then select the desired subset, or one or more user submissions to be shown in a linear or chained order as the Third Content, or video content 160C.

In block 610, system 100 provides video content 160 for display via the social media application. For example, the first user or Host may control user device 180A to click a "Publish" button at content management tool 110. This, in turn, provides the indication of approval for publication, and video content 160C is thereby made available for streaming to other users via video streaming service 150. Other user devices executing the social media application can therefore stream, download, or share video content 160C from video streaming service 150 for output to an integrated or external display.

VI. Hardware Overview

According to one implementation, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
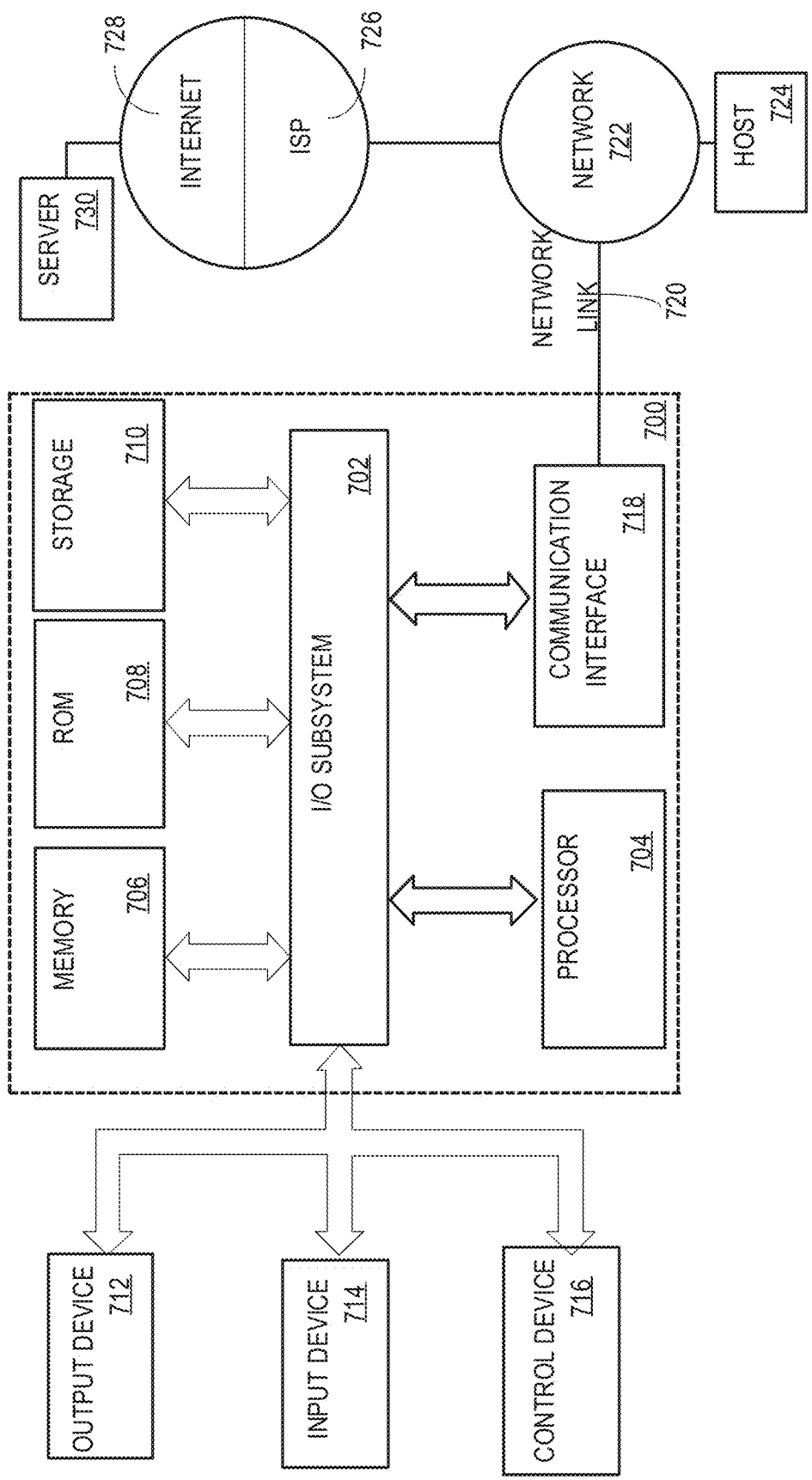
FIG. 7 is a block diagram that depicts an example computer system upon which embodiments may be implemented.

FIG. 7 is a block diagram that illustrates an example computer system with which an implementation may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one implementation, output device 712 is a digital computer display. Examples of a display that may be used in various implementations include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another implementation, computer system 700 may comprise an internet of things (IoT) device in which one or more of the output device 712, input device 714, and control device 716 are omitted. Or, in such an implementation, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one implementation, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative implementations, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an implementation, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an implementation, for security and reliability, an operating system may prevent direct communication between independent processes, providing strictly mediated and controlled inter-process communication functionality.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method for generating video content, comprising:
after completion of a first video recording of a first user participating in a first session, providing, for display via a social media application, the first video recording of the first user participating in the first session, wherein the first session includes first content;
transmitting, by the social media application, the first video recording to a plurality of devices;
receiving, through the social media application, a plurality of video submissions, from the plurality of devices, wherein:
each video submission of the plurality of video submissions has been completed and submitted prior to being received through the social media application,
content of each video submission of the plurality of video submissions was created based on or responsive to the first video recording, and
each video submission of the plurality of video submissions comprises a second video recording of a user of a device of the plurality of devices;
analyzing content of the plurality of video submissions to generate, for each of the plurality of video submissions, an aggregate enthusiasm score;
providing, for display by a cloud-based software tool associated with the social media application, an ordered view of the plurality of video submissions based on the aggregate enthusiasm scores of the plurality of video submissions;
providing, by the cloud-based software tool associated with the social media application, controls for selecting one or more video submissions of the plurality of video submissions;
determining the one or more selected video submissions based on user input from the ordered view;
the cloud-based software tool generating a new audiovisual work by creating a content compilation comprising at least a portion of the first video recording and at least portions of each of the one or more selected video submissions; and
providing the new audiovisual work for display via the social media application.

2. The method of claim 1, wherein each video submission of the plurality of video submissions comprises a video recording of a user of a device of the plurality of devices asynchronously participating in the first session.

3. The method of claim 1, wherein
the ordered view of the plurality of video submissions is further based on one or more sorting criteria applied to the plurality of devices or the users of the plurality of devices.

4. The method of claim 3, wherein the one or more sorting criteria include at least one of: a reputation score, an influencer score, a subscriber loyalty score, a contributor score, or a linked account score.

5. The method of claim 1, wherein prior to receiving the plurality of video submissions, the plurality of video submissions is moderated using a computer vision model applied to video content in the plurality of video submissions.

6. The method of claim 1, wherein at least one of the plurality of video submissions is ordered in one or more video transmission or processing queues based on an associated priority level.

7. The method of claim 1, wherein the first session corresponds to at least one of: a video-based game show, a video-based game application, an augmented reality experience, a video commentary, or a video reaction.

8. The method of claim 1, wherein:
analyzing content of the plurality of video submissions comprises generating, for each video submission, associated metadata indicating one or more device related interactions,
the aggregate enthusiasm score is generated based on the metadata, and
the one or more device related interactions include one or more of:
  motion sensor data,
  accelerometer data,
  audio analysis from a microphone or other audio recording device,
  facial recognition,
  facial sentiment,
  facial modeling,
  detected objects of interest, or
  changes in camera perspective and positioning.

9. The method of claim 3, wherein each video submission of the plurality of video submissions has associated metadata and wherein the one or more sorting criteria are applied to metadata indicating gameplay related parameters including one or more of:
  answers that the user provided,
  scores,
  points,
  leaderboard position,
  high score ranking,
  achievement progress,
  level completion rate,
  event participation,
  ranking within a group of users,
  longest winning streak, or
  best score improvement.

10. A non-transitory computer readable medium comprising instructions executable by a processor to:
  after completion of a first video recording of a first user participating in a first session, provide, for display via a social media application, the first video recording of the first user participating in the first session, wherein the first session includes first content;
  transmit, by the social media application, the first video recording to a plurality of devices;
  receive, through the social media application, a plurality of video submissions, from the plurality of devices, wherein:
    each video submission of the plurality of video submissions has been completed and submitted prior to being received through the social media application,
    content of each submission of the plurality of video submissions was created based on or responsive to the first video recording, and
    each video submission of the plurality of video submissions comprises a second video recording of a user of a device of the plurality of devices;
  analyzing content of the plurality of video submissions to generate, for each of the plurality of video submissions, an aggregate enthusiasm score;
  providing, for display by a cloud-based software tool associated with the social media application, an ordered view of the plurality of video submissions based on the aggregate enthusiasm scores of the plurality of video submissions;
  provide, by the cloud-based software tool associated with the social media application, controls for selecting one or more video submissions of the plurality of video submissions;
  determining the one or more selected video submissions based on user input from the ordered view;
  the cloud-based software tool generating a new audiovisual work by creating a content compilation comprising at least a portion of the first video recording and at least portions of each of the one or more selected video submissions; and
  provide the new audiovisual work for display via the social media application.

11. The non-transitory computer readable medium of claim 10, wherein each video submission of the plurality of video submissions comprises a video recording of a user of a device of the plurality of devices asynchronously participating in the first session.

12. The non-transitory computer readable medium of claim 10, wherein
the ordered view of the plurality of video submissions is further based on one or more sorting criteria applied to the plurality of devices or the users of the plurality of devices.

13. The non-transitory computer readable medium of claim 12, wherein the one or more sorting criteria include at least one of: a reputation score, an influencer score, a subscriber loyalty score, a contributor score, or a linked account score.

14. The non-transitory computer readable medium of claim 10, wherein prior to receiving the plurality of video submissions, the plurality of video submissions is moderated using a computer vision model applied to video content in the plurality of video submissions.

15. The non-transitory computer readable medium of claim 10, wherein at least one of the plurality of video submissions is ordered in one or more video transmission or processing queues based on an associated priority level.

16. The non-transitory computer readable medium of claim 10, wherein the first session corresponds to at least one of: a video-based game show, a video-based game application, an augmented reality experience, a video commentary, or a video reaction.

17. The non-transitory computer readable medium of claim 10, wherein:
analyzing content of the plurality of video submissions comprises generating, for each video submission, associated metadata indicating one or more device related interactions,
the aggregate enthusiasm score is generated based on the metadata, and
the one or more device related interactions include one or more of:
  motion sensor data,
  accelerometer data,
  audio analysis from a microphone or other audio recording device,
  facial recognition,
  facial sentiment,
  facial modeling,
  detected objects of interest, or
  changes in camera perspective and positioning.

18. The non-transitory computer readable medium of claim 12, wherein each video submission of the plurality of video submissions has associated metadata and wherein the one or more sorting criteria are applied to metadata indicating gameplay related parameters including one or more of:
  answers that the user provided, scores,
points,
leaderboard position,
high score ranking,
achievement progress,
level completion rate,
event participation,
ranking within a group of users,
longest winning streak, or
best score improvement.

19. One or more computing devices comprising:
one or more processors;
volatile memory operatively coupled to the one or more processors;
one or more non-transitory storage media operatively coupled to the one or more processors;
instructions which, when executed by the one or more processors, cause the one or more computing devices to:
  after completion of a first video recording of a first user participating in a first session, provide, for display via a social media application, the first video recording of the first user participating in the first session;
  wherein the first session includes first content;
  transmit, by the social media application, the first video recording to a plurality of devices;
  receive, through the social media application, a plurality of video submissions, from the plurality of devices, wherein:
    each video submission of the plurality of video submissions has been completed and submitted prior to being received through the social media application,
    content of each video submission of the plurality of video submissions was created based on or responsive to the first video recording, and
    each video submission of the plurality of video submissions comprises a second video recording of a user of a device of the plurality of devices;
  analyzing content of the plurality of video submissions to generate, for each of the plurality of video submissions, an aggregate enthusiasm score;
  providing, for display by a cloud-based software tool associated with the social media application, an ordered view of the plurality of video submissions based on the aggregate enthusiasm scores of the plurality of video submissions;
  provide, by a cloud-based software tool associated with the social media application, controls for selecting one or more video submissions of the plurality of video submissions;
  determining the one or more selected video submissions based on user input from the ordered view;
  the cloud-based software tool generating a new audiovisual work by creating a content compilation comprising at least a portion of the first video recording and at least portions of each of the one or more selected video submissions; and
  provide the new audiovisual work for display via the social media application.

20. The one or more computing devices of claim 19, wherein:
analyzing content of the plurality of video submissions comprises generating, for each video submission, associated metadata indicating one or more device related interactions,
the aggregate enthusiasm score is generated based on the metadata, and
the one or more device related interactions include one or more of:
  motion sensor data,
  accelerometer data,
  audio analysis from a microphone or other audio recording device,
  facial recognition,
  facial sentiment,
  facial modeling,
  detected objects of interest, or
  changes in camera perspective and positioning.

* * * * *